Oct. 22, 1935. J. ZUBATY 2,018,170
LOST MOTION LINKAGE FOR FUEL PUMPS
Filed Sept. 12, 1928

Inventor
Joseph Zubaty

By Blackmore, Spencer & Hulse
Attorneys

Patented Oct. 22, 1935

2,018,170

UNITED STATES PATENT OFFICE

2,018,170

LOST MOTION LINKAGE FOR FUEL PUMPS

Joseph Zubaty, Flint, Mich., assignor, by mesne assignments, to General Motors Corporation, Detroit, Mich., a corporation of Delaware Application September 12, 1928, Serial No. 305,423

1 Claim. (Cl. 103—215)

This invention relates to fuel pumps such as are employed upon automotive vehicles, and elsewhere in connection with internal combustion engines; and it is a special object of this invention to provide reliable and rugged, but comparatively light and quiet, intermediate means for transmission of variable intake strokes from some pump-actuating element, such as an oscillating lever or rocker arm which may have a uniform throw, to a pump diaphragm stem, or the like.

Alternative lost-motion or thrust-refusing devices having heretofore been proposed for use in transmitting variable intake strokes from an actuating lever, assumed to have an invariable stroke, to a pressure-responsive pumping element (said pumping element being typically a diaphragm secured to a handling member in the general manner suggested in an application by Abraham M. Babitch, S. N. 123,370; filed July 19, 1926) the present invention permits the use, in transmitting tension from such an actuating lever to a pumping member, of a handling member in the form of a reduced diaphragm stem downwardly terminating in a head which may form a stop element; it proposes the interposition, between said lever and said stem, of a special link having but limited pivotal play relatively to said actuating lever; and, in preferred embodiments of this invention, said lever being provided with means resiliently holding a motion-receiving arm thereof in constant engagement with a cyclically moving engine part (such as a cam or eccentric imparting to it a uniform reciprocation) the neighboring ends of the mentioned lever and the mentioned stem may both comprise special heads, these heads being respectively so milled out or so forked or otherwise shaped as to provide one or both of the movable members referred to with a stop surface or surfaces adapted to cooperate with a stop surface or surfaces provided upon or by said link and limiting, without undue contact noise, the range of movement permitted thereto.

The invention herein disclosed differs further from numerous alternative forms referred to in that, even when built-up pressure holds a pump diaphragm down, there must herein occur at least some slight wobbling of a diaphragm stem, producing corresponding slight undulations in a pump diaphragm; and these undulations must continue so long as the mentioned lever is rocked upon its pivot; but the feature here referred to may be of less practical importance than: (1) a shortening of the pump body,—which diminishes the material required therein and the weight thereof; (2) a diminution of the diaphragm stem,—this being favorable to quick changes in the direction of its movement; (3) a reduction in the total number of parts and (4) in the work required thereon; and (5) a facility of assembly. To all of these advances the use of a link or parallel links conditionally functioning as an inward extension of an actuating lever is favorable.

Other objects of this invention, involving the use of a lost-motion link or links whose longitudinal axis or axes may extend more nearly horizontal than vertical, may be best appreciated from the following description of an illustrative embodiment thereof, taken in connection with the appended claim and the accompanying drawing.

Figure 1:
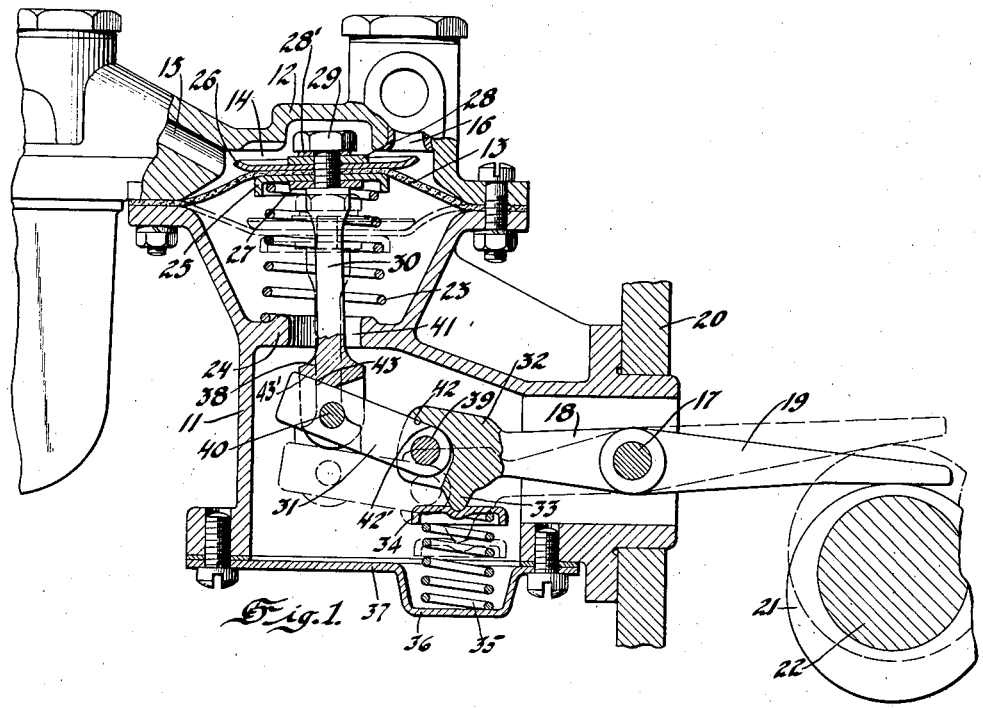
Figure 1 is, for the most part, a substantially median vertical section through a pump illustrating this invention, the solid lines and dotted lines being respectively used to indicate the positions occupied by the movable members at the end of an expulsion stroke and at the end of an intake stroke during periods wherein the pressure within a pump chamber is comparatively low.

Referring first to the conventional parts of the fuel pump illustrated, a main structural element (in the form of a body casting 11) and a subsidiary structural element (in the form of a cover casting 12) are shown as cooperating in the retention of a flexible diaphragm 13. The latter is adapted to serve as a reciprocable pumping member by varying the cubic contents of a pump chamber 14,—shown as provided in the cover casting 12.

The cover casting 12 may include a valved inlet passage 15 and a valved outlet passage 16; an oscillable actuating member in a form of a rocker arm or lever, shown pivoted to the main casting 11 by a pin 17, may comprise an "inner" arm or member 18 and an "outer" arm or member 19, the latter being engageable by some cyclically moving part of an engine 20,—such as a cam 21 upon a camshaft or a crankshaft 22; and means such as a compression spring 23, shown as interposed between an apertured web 24, comprising in the main casting 11, a cupped disc 25, engaging the diaphragm 13, may be employed resiliently to effect expulsion strokes of said diaphragm, or its equivalent.

The diaphragm 13, shown as secured between disc 25 and an oppositely cupped disc 26 by means comprising washers 27, 28 and 28' and a nut 29, may be manipulated by any suitable handling member,—such as a reduced stem 30; and the present invention should be understood as relating more particularly to a novel and advantageous connecting or motion-transmitting means, including parts of the mentioned tension-transmitting stem 30 and neighboring parts of the inner lever member 18 and including also a special lever-extending link or links 31,—the latter being suitably interposed for a conditional or variable transmission of motion from said lever to said stem, or its equivalent.

A head 32 upon the lever member 18 is shown as comprising a boss 33, constantly pressed upward by a cupped plate 34, serving to receive a restorative compression spring 35. The latter may be seated in a suitable depression 36 in a removable bottom closure plate 37; and, instead of providing any separate means for the guidance of the lower end of any part of the diaphragm stem 30, or connecting any link or lever extension therewith at an intermediate level, it is considered preferable, providing said stem with a head 38 and providing the heads 32 and 38 respectively with pins 39 and 40, to pivot upon said pins the mentioned lever-extending link 31,—this link being shown as having its axis disposed in a plane which, although variable according to the extent to which the diaphragm 13 may be held down by internal pressure, departs less from horizontality than from verticality; and any preferred means may be employed to prevent the inner end of said link from so rising as to exceed a predetermined angular relationship, conditionally constituting it an extension of said lever.

If, as shown, the pins 17, 39 and 40 are seated in bored or other cylindrical bearing openings, it will be obvious that any transverse web 24 included in the element 11 must be provided with an opening 41 having sufficient diameter to allow the stem 30 some play therein. The end of the stem 30 and what has been referred to as the inner end of the mentioned actuating lever are both shown as provided with stop surfaces such as might be produced by milling; and the momentary engagements of the lever stop surface 42 and the step stop surface 43 by cooperating with stop surfaces 42' and 43' upon the lever-extending link 31, may be assumed to be substantially simultaneous during full-stroke pumping; but it should be noted that either of the mentioned pairs of cooperating stop surfaces is sufficient for the conditional transmission of motion in the indicated manner; and that the making of any actual contact at 44, when the stem 30 is held down by pressure above diaphragm 13 and the inner arm 18 of the actuating lever is simultaneously uplifted by cam 21, may be of subordinate importance or even undesirable.

Figure 2:
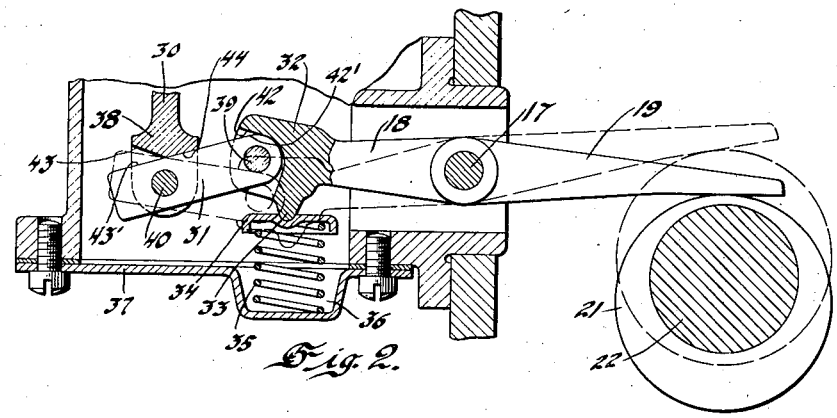
Figure 2 is a vertical sectional view, corresponding to lower portion of Figure 1, but showing relative positions to which various parts are depressed, and a type of lost motion which occurs when the pumping element, shown as a flexible diaphragm, is held down by pressure thereabove.

During operation against low pressures, it will be seen that, as suggested in Figure 1, the lever-extending link 31 may maintain a substantially unvarying angular relationship to any actuating member such as that comprising arms 18 and 19; but that, whenever the pressure within chamber 14 becomes such as to depress the diaphragm 13, and thereby the stem 30, to substantially the level implied by a showing in Figure 2, although the rocking of the arm 18 upon the pivot 17 may then produce a perceptible wobbling of the stem 30 as a result of variations in the substantially horizontal distance between the centers of the pins 17 and 40 (as pin 39 oscillates between the full line position and the double line position shown in Figure 2) the resultant undulation in the diaphragm 13, or its equivalent, may be without practical pumping effect.

Although the foregoing description has included but one complete embodiment of this invention, it should be understood not only that various features thereof might be independently employed but also that numerous modifications might easily be devised, without involving the slightest departure from the spirit and scope of this invention, as the same is indicated in the above and the following claim.

I claim:

A fuel pump having a pump chamber, a movable pumping member, a stem carried thereby, a spring operable upon said pumping member to reduce the pump chamber capacity, a lever pivoted to said pump and having opposed work and power arms, a link pivoted to said stem and to the work arm of said lever, said link and said stem, and said link and said lever having co-operating faces adapted to engage and limit relative movement therebetween, mechanical means to engage the power arm and rock said lever in one direction of rotation only whereby said lever together with the link, when said faces are in engagement, operate as a rigid unit to produce a suction stroke of said pump.

JOSEPH ZUBATY.